(12) United States Patent
Warsta et al.

(10) Patent No.: US 8,554,208 B2
(45) Date of Patent: Oct. 8, 2013

(54) METHOD AND APPARATUS FOR STORING SUBSCRIBER DATA

(75) Inventors: Markus Warsta, Helsinki (FI); Marios Anapliotis, Piraues (GR); Anette Dölker, Esbo (FI); Petri Aalto, Pirkkala (FI); Juha Rontu, Hämeenlinna (FI)

(73) Assignee: Nokia Corporation, Espoo (FI)

( * ) Notice: Subject to any disclaimer, the term of this patent is extended or adjusted under 35 U.S.C. 154(b) by 2630 days.

(21) Appl. No.: 10/528,018

(22) PCT Filed: Sep. 18, 2002

(86) PCT No.: PCT/FI02/00743
§ 371 (c)(1),
(2), (4) Date: May 12, 2005

(87) PCT Pub. No.: WO2004/028191
PCT Pub. Date: Apr. 1, 2004

(65) Prior Publication Data
US 2005/0202816 A1    Sep. 15, 2005

(51) Int. Cl.
*H04W 4/00* (2009.01)

(52) U.S. Cl.
USPC .............. 455/433; 455/456.1; 455/422.1; 455/466; 455/435.1

(58) Field of Classification Search
USPC .............. 455/422.1, 432.1, 433, 435.1
See application file for complete search history.

(56) References Cited

U.S. PATENT DOCUMENTS

| | | | | |
|---|---|---|---|---|
| 5,732,131 A | * | 3/1998 | Nimmagadda et al. | 379/221.13 |
| 5,915,220 A | * | 6/1999 | Chelliah | 455/435.2 |
| H1918 H | * | 11/2000 | Hoffpauir et al. | 379/242 |
| 6,961,564 B2 | * | 11/2005 | Silfverberg et al. | 455/432.3 |
| 7,096,023 B1 | * | 8/2006 | Eikkula | 455/445 |
| 2003/0092436 A1 | * | 5/2003 | Boivin | 455/419 |
| 2003/0190913 A1 | * | 10/2003 | Coad et al. | 455/435.1 |
| 2004/0053604 A1 | * | 3/2004 | Ratilainen et al. | 455/414.2 |
| 2004/0132449 A1 | * | 7/2004 | Kowarsch | 455/432.1 |
| 2004/0185827 A1 | * | 9/2004 | Parks | 455/406 |
| 2005/0202816 A1 | * | 9/2005 | Warsta et al. | 455/433 |

FOREIGN PATENT DOCUMENTS

| | | |
|---|---|---|
| EP | 0 762 714 A2 | 3/1997 |
| EP | 1 065 904 A1 | 1/2001 |
| WO | WO 99/27724 | 6/1999 |
| WO | WO 01/31952 | 5/2001 |
| WO | WO 0213569 A1 * | 2/2002 |
| WO | WO 02/054786 | 7/2002 |
| WO | WO 02093689 A1 * | 11/2002 |

* cited by examiner

*Primary Examiner* — Willie J Daniel, Jr.
(74) *Attorney, Agent, or Firm* — Alston & Bird LLP (57) ABSTRACT

A method of managing subscriber data in a communication network, the method comprising: sending a message associated with a subscriber and including data relating to the identity of said subscriber; routing said message to a first network entity based on identity and routing information stored at a register; subsequent to receiving said message at the first network entity provisioning a second network entity with subscriber data required by said second network entity to be able to service said subscriber; and updating routing information associated with the subscriber at the register to route subsequent signalling to the second network entity.

36 Claims, 6 Drawing Sheets

METHOD AND APPARATUS FOR STORING SUBSCRIBER DATA

FIELD OF THE INVENTION

The present invention relates to a method and apparatus for managing the storage of subscriber data for subscribers of a telecommunications network, and in particular, but not exclusively, to storing the data of inactive subscribers.

BACKGROUND OF THE INVENTION

A cellular telecommunications system is a communication system that is based on use of radio access entities and/or wireless service areas. The access entities are typically referred to as cells. Examples of cellular telecommunications systems include standards such as the GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access), TDMA/CDMA (Time Division Multiple Access/Code Division Multiple Access) in UMTS (Universal Mobile Telecommunications System), IMT 2000, i-Phone and so on.

In a cellular system, a base transceiver station (BTS) provides a wireless communication facility that serves mobile stations (MS) or similar wireless user equipment (UE) via an air or radio interface within the coverage area of the cell.

A feature of the cellular system is that it provides mobility for the mobile stations. In other words, the mobile stations are enabled to move from a location area to another location area. The mobile stations may even roam from a network to another network that is compatible with the standard the given mobile station is adapted to. A feature of the mobility function is that it records location area information concerning the location of a particular mobile station in a given moment of time. A cellular communications system typically comprises a location register or several location registers for the location management purposes. The location management function typically operates such that whenever a mobile station enters a new location or routing area, the location area information associated with the mobile station is updated at an associated location register or several registers.

For example, in a circuit switched GSM (Global System for Mobile) network a controller function is provided by means of a mobile switching centre (MSC). The location information of a mobile station is maintained centrally by a home location register (HLR), wherein the mobile station is permanently registered as a subscriber profile at the home location register. At the same time the mobile station is registered locally by a visitor location register (VLR). A VLR is typically implemented in connection with the MSC, but the system handles the MSC and the VLR as separate logical entities. The mobile station will be registered only temporarily to the visitor location register. Each of the mobile switching centres (MSC) is typically provided with a visitor location register. The VLR at which the mobile station is temporarily registered at a given moment is the VLR of the MSC that is currently serving the mobile station. The HLR may be a stand alone element in the network or the HLR may be integrated with another network element, such as located within one of the switching centres provided in the network. Even though it is not necessary, the arrangement is typically such that the HLR knows the VLR at which the MS is currently registered and the VLR knows then the actual location area (LA) within which the MS is currently located.

Information of the location area is needed for various purposes. For example, when somebody tries to establish a call terminating at a mobile station or send a short text message to the mobile station, the communication system has to be aware of the location area so that it may route the call related signalling and the call into a correct location area and page the mobile station in that area.

Accordingly, although subscriber profiles are permanently registered at the HLR, a subscriber only needs to be registered on the HLR if the subscriber is active, i.e. at times when a subscriber may make or receive a call. However, at present a large amount of storage space on HLRs is taken up by profiles for subscribers who are inactive, i.e. those who are not able to place and/or receive calls. This means that the storage space of the HLR that stores profiles for subscribers who are inactive is effectively wasted. Since the cost of storage space is expensive, this is highly undesirable.

Subscriber information in a mobile communication system may also be stored in a number of other elements such as Voice Mail Systems, Short Message Service Centers, IN-servers, Multimedia Messaging Center. The subscriber information in these elements is provisioned typically at the same time as in the HLR, so the same waste of storage space issues also concern these elements. For provisioning purposes typically a dedicated provisioning solution is used, hereafter provisioning gateway.

For example, subscriber profiles are created on the HLR for SIM (subscriber identity module) cards sold in the so called 'prepaid' mobiles. Prepaid mobiles are those which can be bought of the shelf without the need for a contract. In order to make calls from the mobile the user must pay the network operator in advance of making any calls. Before the prepaid mobiles are sold and registered by the user, the storage space on the HLR allocated to the unsold phone generates no revenue and is therefore wasted.

A further example of when the storage space of the HLR is taken up by a subscriber and generates no revenue is when a prepaid subscriber keeps their credit balance at zero. One solution to this problem is to delete the subscriber profile from the HLR after a predetermined time, typically a couple of months. However this solution is unsatisfactory since when the subscriber wishes to resume use of their prepaid mobile, they are required to purchase a new SIM card.

A still further example is when a post paid subscriber becomes temporarily inactive. The inactive state may last a substantially long time (e.g. the subscriber is abroad or using another subscription.) Despite the inactive state, the network operator may have legal obligations to maintain the subscriber record at the HLR; or the network operator may not wish to force the subscriber to buy a new SIM card if the subscriber wishes to revert to using the subscription.

SUMMARY OF THE INVENTION

Embodiments of the present invention aim to address one or several of the above problems.

According to one aspect of the present invention, there is provided a method of managing subscriber data in a communications network, the method comprising sending a message associated with a subscriber and including data relating to the identity of said subscriber, routing said message to a first network entity based on identity and routing information stored at a register, subsequent to receiving said message at the first network entity, provisioning a second network entity with subscriber data required by said second network entity to be able to service said subscriber, and updating routing information associated with the subscriber at the register to route subsequent signalling to the second network entity.

According to another aspect of the present invention there is provided a communication system for servicing subscribers, comprising a first network entity for storing subscriber data for inactive subscribers, a second network entity for storing subscriber data required for enabling service profiles for subscribers of the communication system, a register for providing routing information for routing messages associated with subscribers, means for provisioning the second network entity with subscriber data associated with a subscriber to be activated and stored at the first network entity based on a message including information relating to the identity of said subscriber, the arrangement being such that the subscriber is activated by provisioning the second network entity with subscriber data from the first network entity and by updating routing information associated with said subscriber at the register to route subsequent signalling associated with said subscriber to the second network entity.

According to another aspect of the present invention there is provided a subscriber data management entity for a communications network, said subscriber data management entity being arranged to store subscriber data for inactive subscribers and to provision at least one another entity of the communication network with subscriber data associated with a subscriber to be activated based on a message including information relating to the identity of said subscriber.

According to another aspect of the present invention there is provided a register for a communications network, said register being arranged to store routing information relating to the identity of a plurality of subscribers, to route signalling associated with inactive subscribers to a first network entity and to update routing information for at least one of said plurality of subscribers to route signalling to a second network entity when said at least one of said plurality of subscribers becomes active.

The embodiments of the invention may provide a method and apparatus by means of which it is possible to provide more effective and flexible management of subscriber data. Such embodiments may enable more economical storage of subscriber data.

The embodiments in accordance with a second aspect of the invention may provide a method and apparatus by means of which it is possible to retain data associated with subscribers who have become inactive. Such embodiments may obviate the requirement to discard inactive subscribers.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
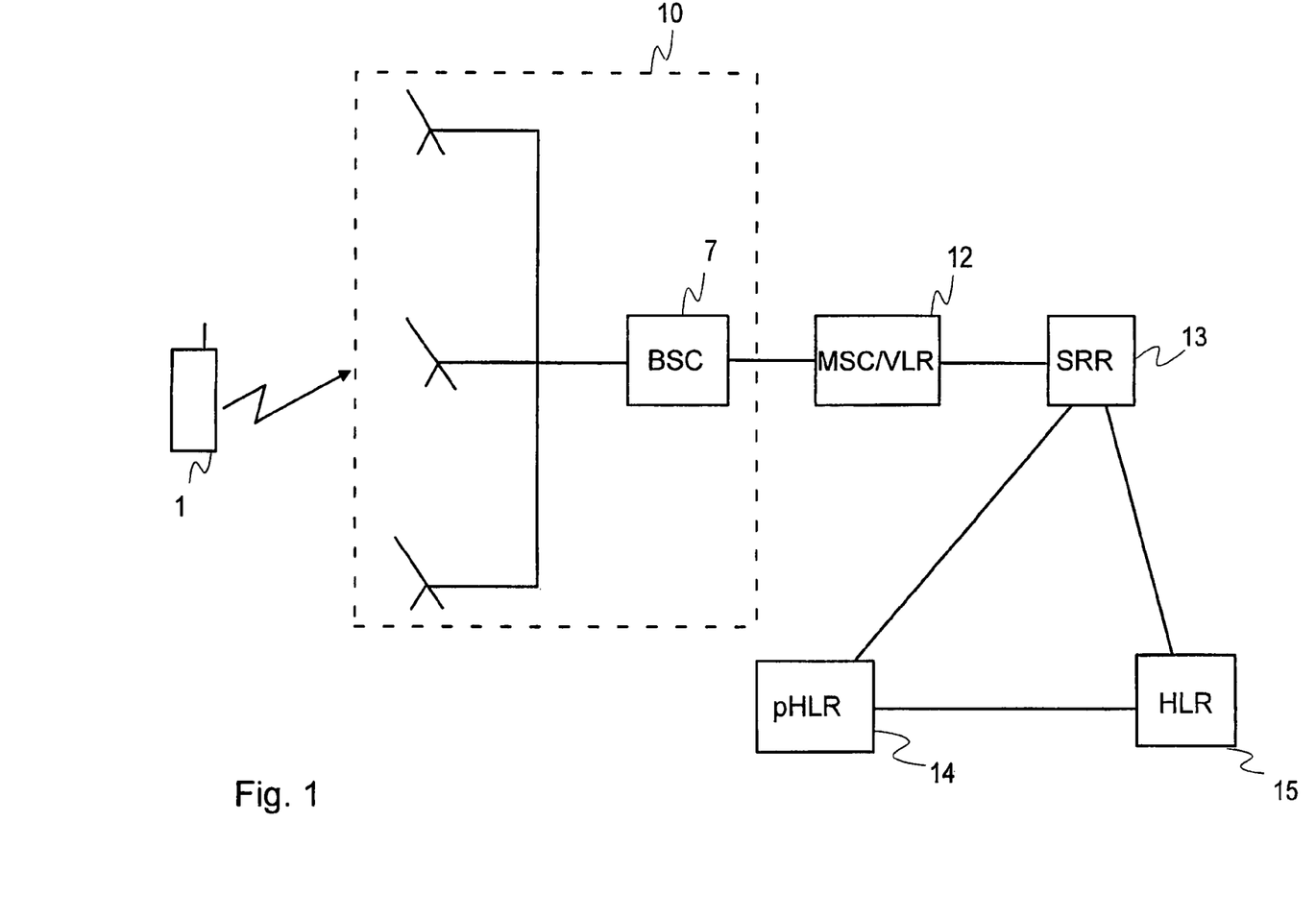
FIG. 1 shows a part of a cellular public land mobile network (PLMN) in which the embodiments of the present invention may be employed.
Figure 2:
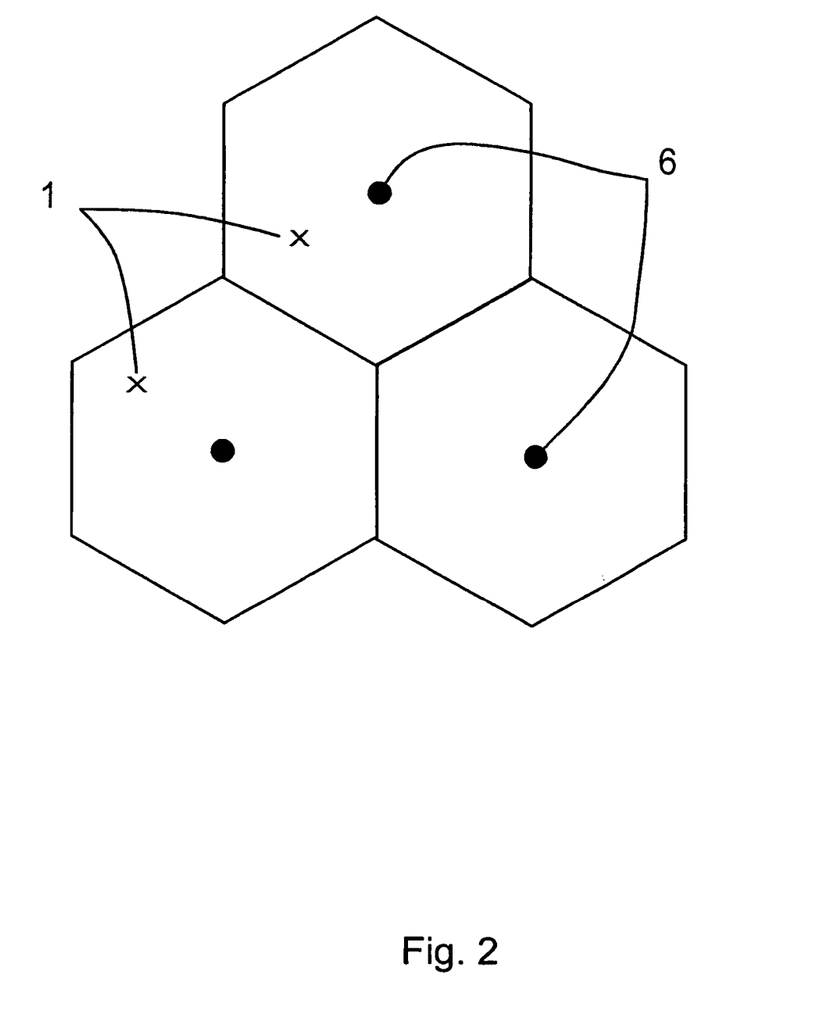
FIG. 2 shows schematically an area covered by a plurality of access entities.

Reference is made first to FIGS. 1 and 2. FIG. 1 shows a part of a cellular public land mobile network (PLMN) in which the embodiments of the present invention may be employed. FIG. 2 shows schematically an area covered by a plurality of access entities, i.e. cells of the cellular communication system of FIG. 1. Each cell has associated therewith a base station 6. The $3^{rd}$ generation telecommunications systems the base station may be referred to as node B. The term base station will be used in this document to encompass all elements which transmit to and/or receive signals from mobile stations 1 or the like via the air interface. Likewise, the wireless station or mobile stations 1 are able to transmit signals to and receive signals from the respective base station via wireless communication with the base stations.

The base stations in FIG. 2 are shown as providing hexagonal shaped radio coverage, however in practice a base station may provide differently shaped radio coverage. It should be appreciated that the size and shape of the cells or other access entities is typically not as regular as what is shown in FIG. 2, but will depend on the conditions in the area and the communication application.

The mobile stations 1 are able to move within the cell and also from one cell coverage area to another cell coverage area. The location of a mobile station may thus vary in time as the mobile station is free to move within the service area of the communication system.

Some of the elements of a mobile network system used in the present invention will now be discussed in more detail. The mobile station or user equipment 1 is arranged to communicate via the air interface with a respective base station 6 of a radio network subsystem 10. Each base station is controlled by a respective network controller 7, such as a radio network controller RNC of the $3^{rd}$ generation telecommunication system, or a base station controller BSC in GSM systems. The arrangement of the access network controller is not essential for the operation of the invention, and will therefore not be discussed in any greater detail.

Access network controller 10 may be connected to a controller node such as a MSC (mobile switching centre). The MSC provides various control functions. Incorporated with the MSC is a VLR (visitor location register). Together the MSC and VLR, jointly referred to by reference number 12, keep track of a mobile station's location for the purposes of call routing as previously discussed, and perform security functions and access control. Although not shown, the radio access system is typically connected to other parts of the communication system via appropriate interfaces and/or gateways.

The MSC/VLR 12 is connected to a SRR (service routing register) 13. The SRR 13 is an element currently used in mobile communications to enable mobile number portability.

Each subscriber is provided with an MS-ISDN number (mobile station-integrated services digital network number) and an IMSI (international mobile subscriber identity) number. The MS-ISDN provides the number that is known to public as the "Telephone number" of the subscriber. The MS-ISDN is unique to each subscriber and is used globally by the telephone networks to identify a subscriber and to route calls to subscriber. The use of MS-ISDNs is based on the so called E.164 numbering plan.

The IMSI number in turn is used for Mobility Management messages between Mobile Station, VLRs and HLRs. The IMSI is only used in mobile network environment, i.e. internally in a mobile network and for traffic between mobile networks. The IMSI number ranges are allocated to operators according to an international standard known as E.212. The number ranges identify countries and operators within the respective countries to facilitate Mobility Management routing. The IMSI also identifies the subscriber.

For technical reasons the MS-ISDN numbers cannot be, used for the Mobility Management messages as the MS-ISDN number is not typically known to the mobile station (MS). Instead, only an IMSI is stored on the identity module of the mobile station. The identity module may be provided by a chip such the SIM-card (Subscriber Identity Module), U-SIM, Universal Mobile telecommunications system SIM), and so on.

The MS-ISDN-number has been used for routing calls between operators as previously discussed. However due to the advent of number portability, where subscribers are able to keep the same MS-ISDN number e.g. when changing network operators, routing based simply on the MS-ISDN number is no longer possible.

In order to overcome this a network entity referenced to as an SRR (service routing register) was introduced/adapted to route calls by recognising the MS-ISDN numbers belonging to subscribers who had changed networks but retained the same MS-ISDN number. Therefore a mobile network may be provided with an SRR connected to an appropriate controller node to allow calls to and from a ported number. In FIG. 1 an SRR 13 is connected to the MSC/VLR 12.

It is also possible to route IMSI-addressed Mobility Management messages in a similar fashion as MS-ISDN addressed messages via an SRR. Typically this has not been needed because operators have used a substantially fixed numbering scheme within their IMSI-numbering range. For example, it is common that two first digits within a range point to a specific HLR, so that it is easy to maintain routing tables in several MSCs.

The SRR 13 facilitates routing using two databases, the first of which stores a list of ranges of MS-ISDN/IMSI numbers. Each range points to a particular network operator's HLR. The second database stores a list of individual MS-ISDN numbers for subscribers who have changed networks, together with a list of HLRs to which signalling information should be directed. This second database in the SRR overlies the first and is checked before signalling information is routed to the HLR corresponding to the stored ranges of the MS-ISDN numbers.

The SRR 13 is typically connected to a plurality of HLRs. There are typically two or more SRRs for availability and capacity reasons in a network, the databases are identical and must also be kept identical with provisioning system, however for clarity reasons a single HLR 15 and SRR 13 are shown in FIG. 1.

In an embodiment of the present invention the SRR entity 13 additionally stores a list of individual IMSI numbers for inactive subscribers. This shall be discussed in detail hereinafter.

In a preferred embodiment of the present invention a virtual home location register 14 is provided. The virtual HLR 14 can be seen as an additional network entity arranged to store data for inactive subscribers and to provision the HLR with subscriber data should an inactive subscriber become activated. Thus this entity will in the following be referred to as a provisioning home location register (pHLR). The term 'inactive subscribers' may cover any situation where an IMSI number has been generated by an operator, but for some reason the IMSI number is not in use. This may arise after the creation of a SIM card for a prepaid phone which has not yet been sold or registered with the network. In this case an IMSI number will exist for the SIM card, but the SIM card will not be in use. A second example of a situation covered by the term 'inactive subscriber' may be when the network recognises that an existing subscriber has not used their phone for a predetermined time—for example, a month. A third example could be when a subscriber or an operator decides that the subscription should be inactivated such that it can be taken back for use later on. These examples are not exhaustive and further examples of 'inactive subscribers' are given hereinafter.

When an inactive subscriber has been identified, for example by a network operator after the creation of a prepaid SIM which has yet to be sold, the IMSI number and other possible subscription data is stored on the pHLR 14. These SIM-cards may be arranged to belong to a certain IMSI-range. This range has been configured in the SRR database to point signalling to the pHLR 14 instead of the HLR 13.

Figure 3:
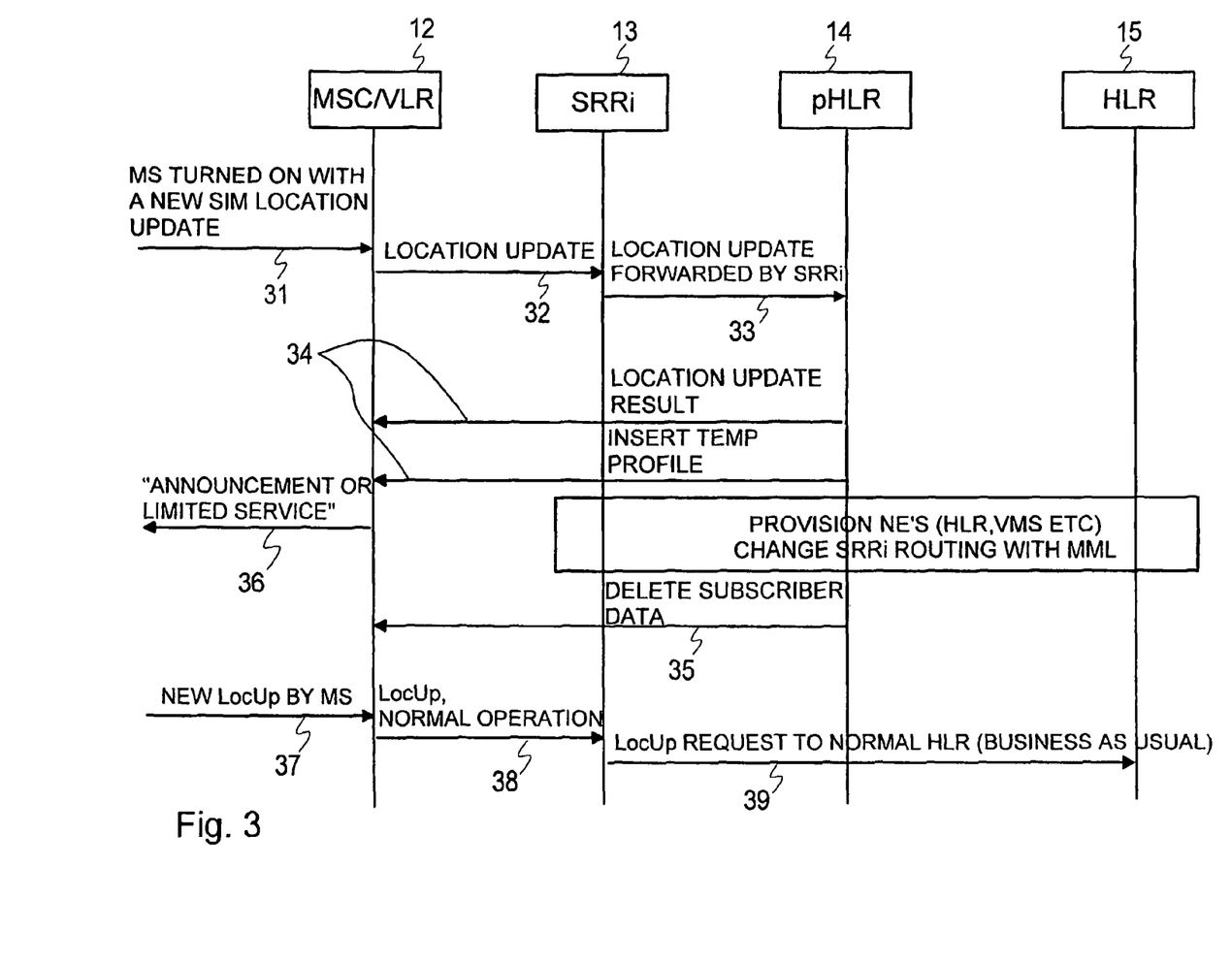
FIG. 3 shows a schematic representation of signalling between nodes in a network embodying an example of the present invention.
Figure 4:
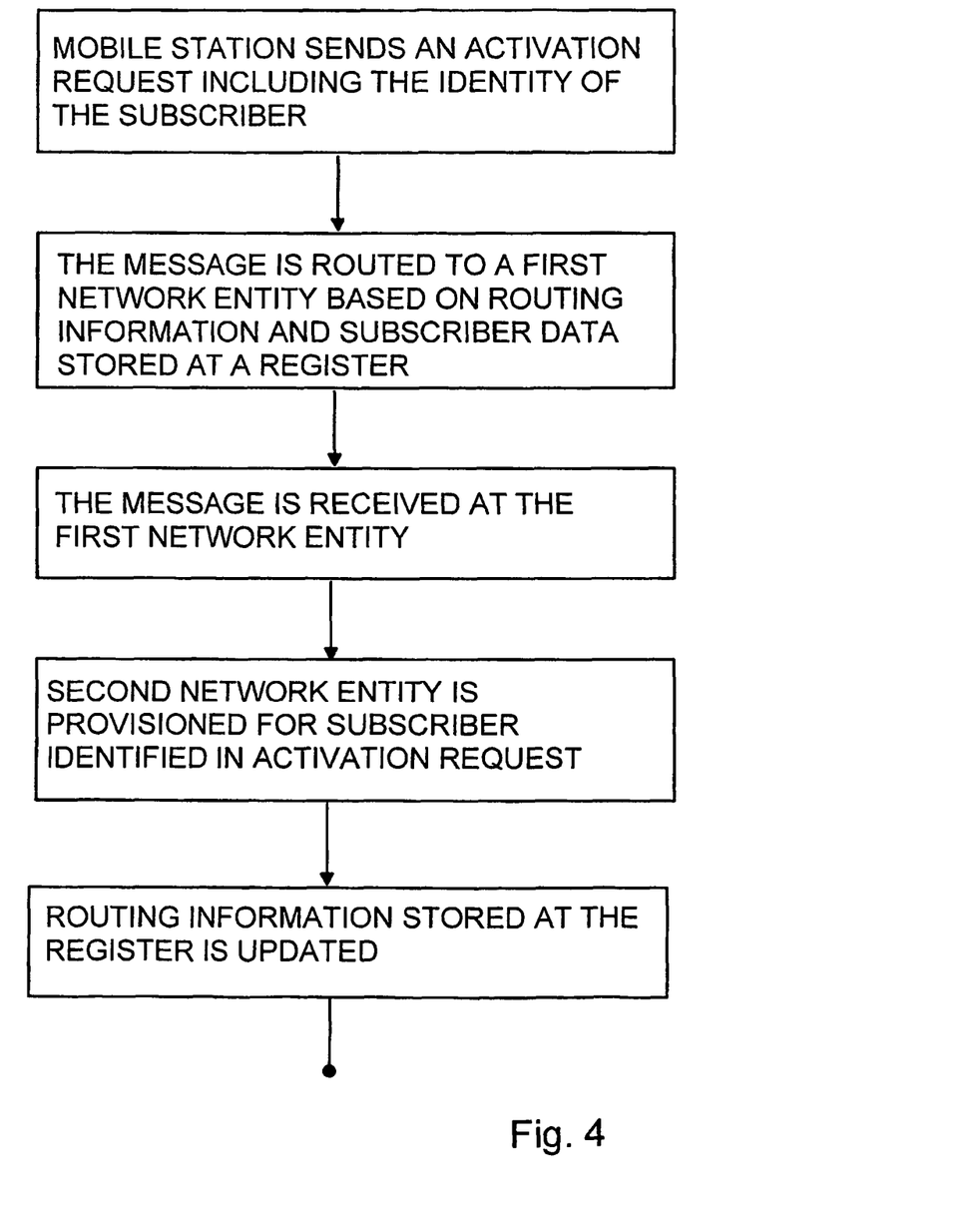
FIG. 4 shows a flow chart embodying an example of the present invention.

Reference is now made to FIG. 3 which shows signalling between the nodes in a network in an embodiment of the present invention, and also to the flow chart of FIG. 4 showing the main steps of the embodiment.

When a mobile station 1 associated with an inactive subscriber is activated and attempts to register with the network, the mobile station sends a message 31 via the radio access network 10 to the MSC/VLR 12. In a preferred embodiment of the invention, the message 31 includes the IMSI number of the subscriber. In response to receiving the message 31, the MSC/VLR 12 sends a message 32 to the SRR 13. The message 32 again includes the IMSI of the SIM from which message 31 originated.

As previously discussed, the SRR 13 is set to point to a pHLR for IMSI numbers associated with inactive subscribers. Therefore, in response to receiving message 32, SRR 13 sends a message 33 to pHLR 14. This message 33 again includes the IMSI number.

On receiving message 33 from the SRR, the pHLR 14 compares the data in the message relating to the identity of the subscriber, in this embodiment of the invention the IMSI number, with a list of IMSI numbers stored at the pHLR 14.

If the pHLR finds a match between the IMSI number contained in the message it has received and an IMSI number stored, the pHLR responds to this message by sending a message 34 to the MSC/VLR 12. This response message can also optionally be configured to go via SRR 13, this depends on how the operator wants to configure the network. This message 34 may serve to indicate to the MSC/VLR 12 that the subscriber identified by the IMSI number contained in the messages 31-33 is a bona fide subscriber who is entitled to access the network.

The message 34 sent from the pHLR 14 to the MSC/VLR 12 may contain authentication triplets and encryption keys, inserting a temporary profile at the MSC/VLR for the subscriber and thus allowing the network to provide the subscriber with a preliminary service during the registration process.

The preliminary service may comprise sending a message 36 to the mobile station announcing that the registration process is in progress. The initial service profile could be operator defined, enabling, for example, a limited service set, such as a voice only connection.

The message 36 may additionally request that the user of the mobile station switches off the mobile station for a predetermined time, e.g. 5 minutes, in order to allow time for completion of the registration process. Again this is preferably an operator definable behaviour for provisioning of all necessary network elements.

Figure 5:
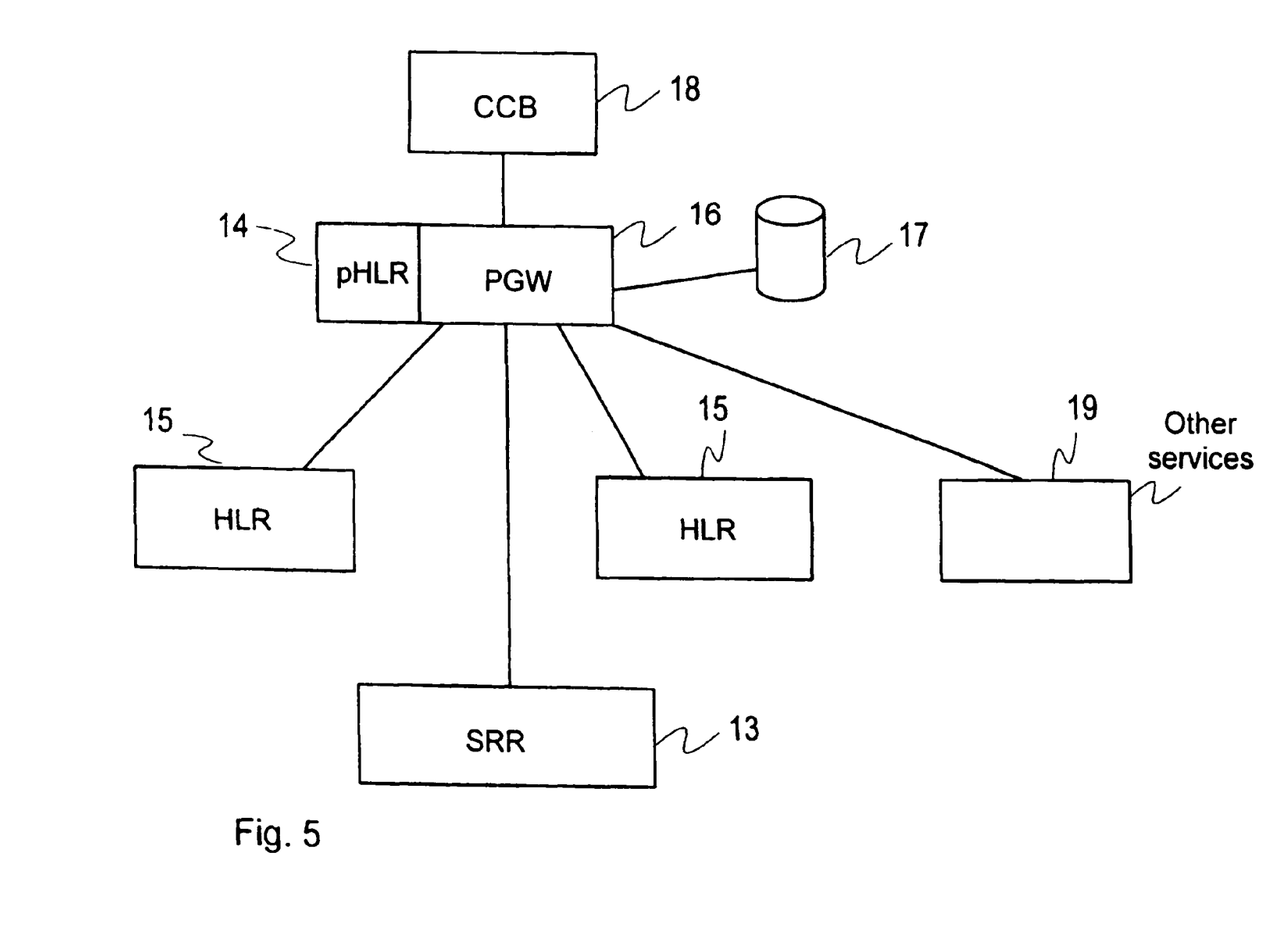
FIG. 5 shows a further part of a cellular public land mobile network (PLMN) in which the embodiments of the present invention may be employed.

Requesting the user to switch off the mobile station allows the pHLR 14 time to provision services for the subscriber via a provisioning gateway 16 (shown in FIG. 5). In a preferred embodiment of the invention the pHLR will control the provisioning of the subscriber with a subscriber profile in an HLR 15 in response to receiving the message 33.

To provision the HLR 15 the pHLR 14 sends the HLR data relating to the identity of the subscriber via the provisioning gateway. In the preferred embodiment the pHLR sends the IMSI/MS-ISDN numbers of the subscriber to the HLR.

The message 31 includes the identity of MSC and VLR where MS 1 is located for message routing purposes. Additional information, such as information relating to the location of the mobile station may be included. The location may relate to the cell in which the mobile is currently located and may therefore be defined by including the identity of the base station with which the mobile station is in communication with. Messages 32 and 33 may then also include the location of the mobile station and/or the identity of the MSC/VLR 12 or any additional information, as required.

The pHLR may also send data relating to the location of the mobile station and/or the identity of the MSC/VLR to the HLR so that routing information may be stored at the HLR upon creation of the subscriber profile via the provisioning gateway. The HLR can then automatically update subscriber profile in the VLR.

Communication between the VLR and the other nodes in the network is facilitated by appropriate mobile networking protocols and signalling such as those based on SS7 (signalling system number 7). For example in GSM networks the GSM MAP (mobile application part) rides on top of SS7, allowing communication between the pHLR, SRR, HLR and VLR.

Typically each network operator has between 1-15 HLRs. In a preferred embodiment of the present invention, the pHLR 14 may be connected to all of a network operator's HLRs, SRRs and other elements containing subscriber data via a provisioning gateway 16 as shown in FIG. 5. FIG. 5 shows a part of the network in which some embodiments of the invention may be employed. In this embodiment, the pHLR may provision an HLR dynamically by allocating the subscriber profile to an HLR which has the greatest amount of unused capacity. The pHLR controls the provisioning gateway for those subscribers who reside in the pHLR. The subscription data is stored in the datastore 17 for inactive subscribers waiting to be activated. Customer Care and Billing system (CCB) 18 is the system used for customer care services of the operator. Typically it also controls the provisioning gateway for post-paid subscriptions. Through the provisioning gateway the pHLR is able to control the provisioning of all required network elements 19, such as Voice Mail Systems, Short Message Service Centres, IN-servers, Multimedia Messaging Centres.

In an embodiment of the invention, after a subscriber profile has been created at the HLR 15 and other network elements containing subscriber specific data, routing information for the subscriber stored at the SRR 13 is updated to point to the HLR 15. This may be done using the normal provisioning functionality of the SRR. This is typically based on the MML (Man Machine Language) over TCP/IP (Transport Control Protocol/Internet Protocol). This type of operation is supported by the provisioning gateway.

Once routing information has been updated at the SRR 13, the temporary profile created for the subscriber at the MSC/VLR 12 may be deleted if it was not automatically updated. The profile may be deleted in response to a message 35 sent from the pHLR 14.

In an embodiment of the present invention, to completely reload the new profile to the VLR 12 from the HLR 15 the user may switch on the mobile station after the predetermined time defined in message 36 has elapsed. When the mobile is switched on a message 37 containing the subscribers IMSI number and mobile station location is sent to the MSC/VLR 12 to register the mobile with the network. On receipt of the message 37, the MSC/VLR 12 sends a message 38 containing the IMSI number of the subscriber to the SRR 13.

Since the routing information stored at the SRR 13 has been updated, when the SRR receives the message 38 from the MSC/VLR, message 39 containing the subscribers IMSI number and MSC/VLR identity/mobile station location can be routed directly to HLR 15 on which the subscriber profile has been created.

According to a possibility, depending on the capabilities of the HLR 15, the pHLR may also provide the HLR 15 (using again provisioning gateway) with the location information of the mobile station and request the HLR 15 to insert new profile data into the VLR without a new LocUp (location update) message from the mobile station. With this feature in HLR 15 it is possible to simplify the instructions for the MS-subscriber. For example, the instructions could be: 'wait a moment', 'you are being provisioned', then an SMS message, 'welcome to our network'.

Figure 6:
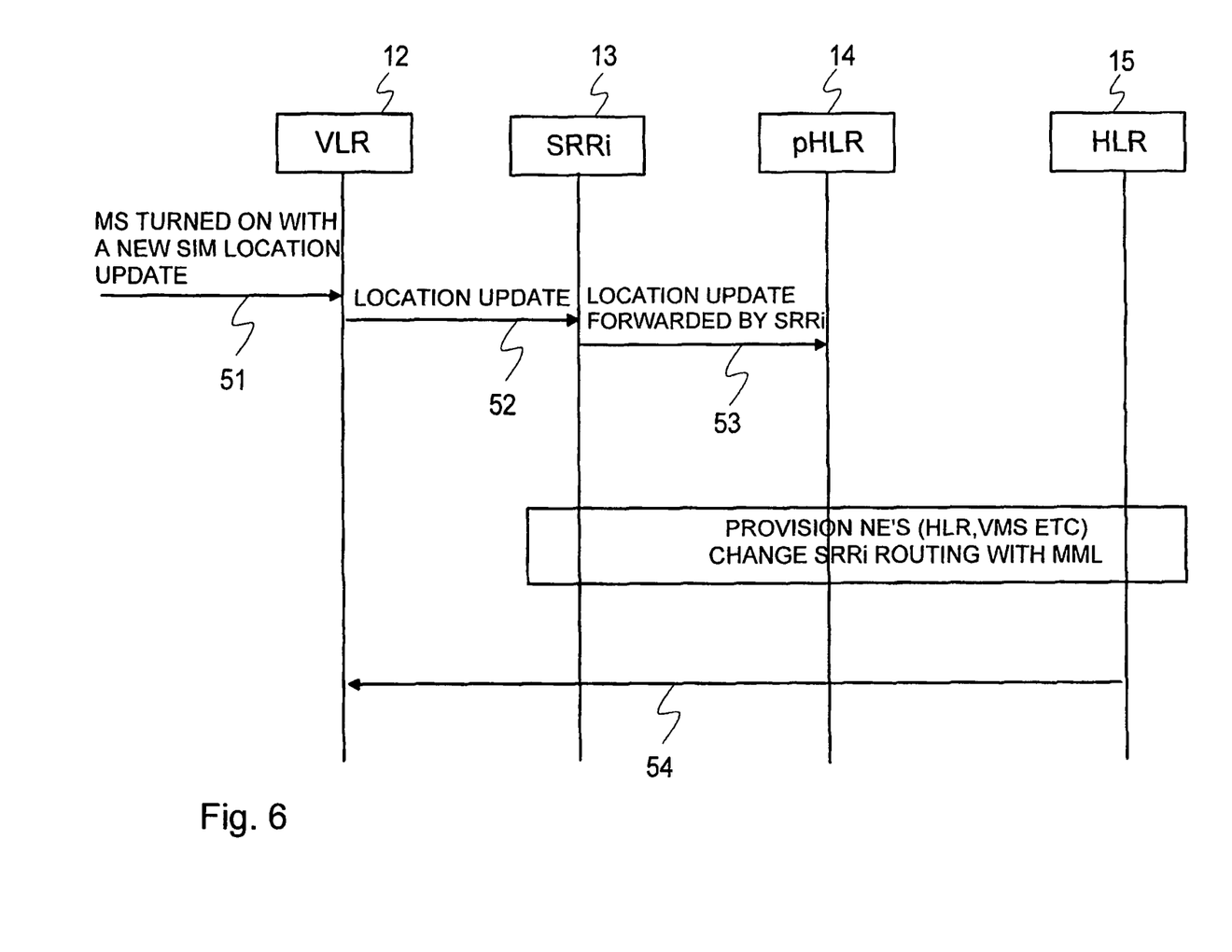
FIG. 6 shows a schematic representation of signalling between nodes in a network embodying an alternative example of the present invention.

FIG. 6 shows an alternative embodiment of the present invention. Messages referred to in FIG. 6 as 51, 52 and 53 are the same as messages 31, 32 and 33 respectively, as discussed in relation to FIG. 3.

In this embodiment of the invention, the pHLR 14 provisions the HLR 15 without creating a temporary profile for the subscriber during registration. Therefore, in response to the message 53 sent from the SRR 13, the pHLR 14 immediately provisions a profile at the HLR for the subscriber via provisioning gateway 16. As before, once an HLR is provisioned, the routing information for the IMSI number of the subscriber, stored at the SRR 13, is updated to point to the HLR. The subscriber may need to wait for a while before the service is activated.

In this embodiment of the invention, the information required to route calls is sent to the MSC/VLR in a message 54 from the HLR. Therefore, this embodiment the mobile station is only required to send one message 51 to register with the network.

Whether or not a network operator decides to provide the subscriber with a provisional service before an HLR is provisioned will depend on the length of time it takes for the pHLR 14 to provision the HLR 15 and SRR 13. This will depend on the hardware used and the compatibility of the pHLR and the HLR.

In a further embodiment of the present invention, data relating to subscriber profiles on the HLR may be transferred to the pHLR and deleted from the HLR. This may occur in response to the subscriber becoming inactive after a subscriber profile has been created in a HLR for the subscriber.

A previously active subscriber may be identified as inactive in response to a number of situations:

For a prepaid phone, the subscriber may be identified as inactive if the balance of the prepaid amount remains at zero for a predetermined time.

A contract/post paid subscriber who has not made or received calls for a predetermined time.

A subscriber who has indicated that they do not wish to make or receive calls for a finite length of time, but wish to resume their subscription with the same IMSI number. This may occur when a subscriber goes on holiday but does not wish to use their mobile station.

A subscriber may be identified as active by one network operator but identified as inactive by a competitor network operator when the subscriber is offered a contract with the competitor network operator.

The above situations are only given as examples and should not be regarded as exhaustive.

It should be appreciated that whilst embodiments of the present invention have been described in relation to mobile stations, embodiments of the present invention are applicable to any other suitable type of user equipment. For example in an alternative embodiment of the present invention a subscriber profile may be created at an HLR in by activating a SIM in equipment used at the point of sale.

FIG. 1 illustrates a single pHLR 14. The SRR may be further connected to a plurality of pHLRs (provisioning home location registers).

In addition to storing the IMSI and MS-ISDN numbers for inactive users, pHLR may also store security information and further details relating to the subscriber and the terms of network subscription.

A network operator may be responsible for a pHLR, similar to the manner in which a network operator is responsible for their own HLR. In an alternative embodiment, the pHLR will be operated by a third party who maintains the pHLR for different network operators at a charge.

In an embodiment of the present invention the HLR will not store inactive subscriber profiles.

It should also be appreciated that the in further embodiments of the present invention the pHLR may be arranged to provision any services and is not just restricted to provisioning HLRs. Other possible applications may include Voice Mail Systems, Mail servers, Multimedia Messaging servers, Wireless application part (WAP) Gateways, Pre-Paid Servers and so on. Furthermore, the HLR may comprise a second generation (2G) HLR or a third generation (3G) HLR. The HLR may support various access systems, such as both the GSM and WCDMA access for Circuit switched calls and packet data through General Packet Radio Service (GPRS).

The embodiment of the present invention has been described in the context of a circuit switched domain. This invention is also applicable to any other techniques, including those of a packet switched domain.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   receiving at a routing register a message associated with an inactive subscriber of a communications network and including data relating to the identity of said subscriber;
   based on the identity of said subscriber and on routing information stored at said routing register, selectively routing said message from said routing register to an inactive subscriber register for storing subscriber data for inactive subscribers; and
   updating said routing information associated with the subscriber at the routing register to route subsequent signaling associated with the subscriber to an active subscriber register, which after the receipt of said message at the inactive subscriber register is provisioned with subscriber data required by the active subscriber register to service said subscriber.

2. The method as claimed in claim 1, further comprising:
   storing a plurality of subscriber identities at the inactive subscriber register; and
   provisioning the active subscriber register with subscriber data if the data relating to the identity of the subscriber in the message corresponds to one of said plurality of subscriber identities.

3. The method as claimed in claim 1, wherein the message is received from a mobile station of said inactive subscriber.

4. The method as claimed in claim 3, wherein the message comprises an international mobile subscriber identity.

5. The method as claimed in claim 3, wherein the message further comprises data relating to the location of the mobile station.

6. The method as claimed in claim 3, further comprising:
   receiving from the inactive subscriber register data for providing the subscriber with a preliminary service.

7. The method as claimed in claim 6, wherein said data received from the inactive subscriber register further comprises authentication information.

8. The method as claimed in claim 6, wherein said preliminary service comprises notifying the subscriber that a service request has been acknowledged.

9. The method as claimed in claim 1, wherein the message is received from a visitor location register.

10. The method as claimed in claim 1, wherein the routing register comprises a service routing register.

11. The method as claimed in claim 1, wherein the inactive subscriber register comprises a provisioning home location register.

12. The method as claimed in claim 1, wherein the active subscriber register comprises a home location register.

13. The method as claimed in claim 1, wherein the inactive subscriber register also functions as one of: a voicemail system entity; a mail server entity; a multimedia messaging server entity; a wireless application part gateway entity; a prepaid server entity; an intelligent network server; a short message service centre; a location based service centre; a unstructured supplementary service data centre; a general packet radio service server; a charging server; and rating server.

14. A method as claimed in claim 1, further comprising:
   determining in said active subscriber register that the subscriber has again become inactive;
   storing subscriber data relating to the subscriber at the inactive subscriber register;
   updating the information stored at said routing register to specify said subscriber as inactive such that the routing register routes subsequent signaling associated with the subscriber to the inactive subscriber register; and
   deleting subscriber data relating to the subscriber from the active subscriber register.

15. The method as claimed in claim 14, further comprising determining that said subscriber has become inactive if the time lapsed since a last message, associated with the subscriber, was routed exceeds a predetermined time.

16. A system, comprising:
   an active subscriber register;
   an inactive subscriber register comprising,
   a storage configured to store subscriber data for inactive subscribers of a communication network,
   a receiver configured to receive a message identifying an inactive subscriber to be activated, and a processor configured to provision the active subscriber register of the communication network with subscriber data associated with the inactive subscriber to be activated based on the received message; and
a routing register comprising
a storage configured to store routing information relating to the identity of a plurality of subscribers of a communication network, and
a processor configured to
route signaling associated with inactive subscribers to an inactive subscriber register, and
update said routing information for at least one of said inactive subscribers to route signaling to an active subscriber register when said at least one of said inactive subscribers becomes active.

17. An apparatus, comprising:
a storage configured to store subscriber data for inactive subscribers of a communication network;
a receiver configured to receive a message identifying an inactive subscriber to be activated; and
a processor configured to provision an active subscriber register of the communication network with subscriber data associated with the inactive subscriber to be activated based on the received message.

18. The apparatus as claimed in claim 17, which is further configured to:
store a plurality of subscriber identities; and
provision said active subscriber register with subscriber data if the data relating to the identity of the subscriber in the message corresponds to one of said plurality of subscriber identities.

19. The apparatus as claimed in claim 17, wherein the message includes an international mobile subscriber identity.

20. The apparatus as claimed in claim 17, which is further configured to send to a control centre data for providing the inactive subscriber with a preliminary service.

21. The apparatus as claimed in claim 20 wherein said data sent to the control centre comprises authentication information.

22. The apparatus as claimed in claim 17, which is further configured to also function as one of: a voicemail system entity; a mail server entity; a multimedia messaging server entity; a wireless application part gateway entity; a prepaid server entity; intelligent network server; short message service centre; location based service centre; unstructured supplementary service data centre; general packet radio service server; charging and rating server.

23. The apparatus as claimed in claim 17 wherein the signalling includes an international mobile subscriber identity.

24. The apparatus as claimed in claim 17, which is further arranged to receive from the inactive subscriber register data for providing the subscriber with a preliminary service.

25. The apparatus as claimed in claim 24, wherein said data received from the inactive subscriber register comprises authentication information.

26. An apparatus, comprising:
a storage configured to store routing information relating to the identity of a plurality of subscribers of a communication network;
a processor configured to
route signaling associated with inactive subscribers to an inactive subscriber register, and
update said routing information for at least one of said inactive subscribers to route signaling to an active subscriber register when said at least one of said inactive subscribers becomes active.

27. The apparatus as claimed in claim 26, wherein the inactive subscriber register comprises a provisioning home location register.

28. The apparatus as claimed in claim 26, wherein the active subscriber register comprises a home location register.

29. A method, comprising:
storing subscriber data for inactive subscribers of a communication network at an inactive subscriber register;
receiving at said inactive subscriber register a message identifying an inactive subscriber to be activated; and
provisioning an active subscriber register of the communication network with subscriber data associated with the inactive subscriber to be activated based on the received message.

30. The method as claimed in claim 29, further comprising:
storing a plurality of subscriber identities at the inactive subscriber register; and
provisioning said active subscriber register with subscriber data if the data relating to the identity of the subscriber in the message corresponds to one of said plurality of subscriber identities.

31. The method as claimed in claim 29, wherein the message includes an international mobile subscriber identity.

32. The method as claimed in clam 29, comprising sending from the inactive subscriber register to a control centre data for providing the inactive subscriber with a preliminary service.

33. The method as claimed in claim 32, wherein said data sent from the inactive subscriber register to the control centre comprises authentication information.

34. The method as claimed in claim 29, wherein the inactive subscriber register comprises a provisioning home location register.

35. The method as claimed in claim 29, wherein the inactive subscriber register also functions as one of:
a voicemail system entity;
a mail server entity;
a multimedia messaging server entity;
a wireless application part gateway entity;
a prepaid server entity;
an intelligent network server;
a short message service centre;
a location based service centre;
a unstructured supplementary service data centre;
a general packet radio service server; and
a charging and rating server.

36. A service routing register, comprising:
a storage configured to store routing information relating to the identity of a plurality of subscribers of a communication network;
a processor configured to
route signaling associated with inactive subscribers to an inactive subscriber register, and
update said routing information for at least one of said inactive subscribers to route signaling to an active subscriber register when said at least one of said inactive subscribers becomes active.

* * * * *

UNITED STATES PATENT AND TRADEMARK OFFICE
CERTIFICATE OF CORRECTION

PATENT NO. : 8,554,208 B2  Page 1 of 1
APPLICATION NO. : 10/528018
DATED : October 8, 2013
INVENTOR(S) : Warsta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2672 days.

Signed and Sealed this
Fifteenth Day of September, 2015

Michelle K. Lee
*Director of the United States Patent and Trademark Office*